Jan. 16, 1940.　　　　R. F. SCHUTZ　　　　2,187,176
SPECTACLE CASE
Filed June 27, 1938　　　2 Sheets-Sheet 2
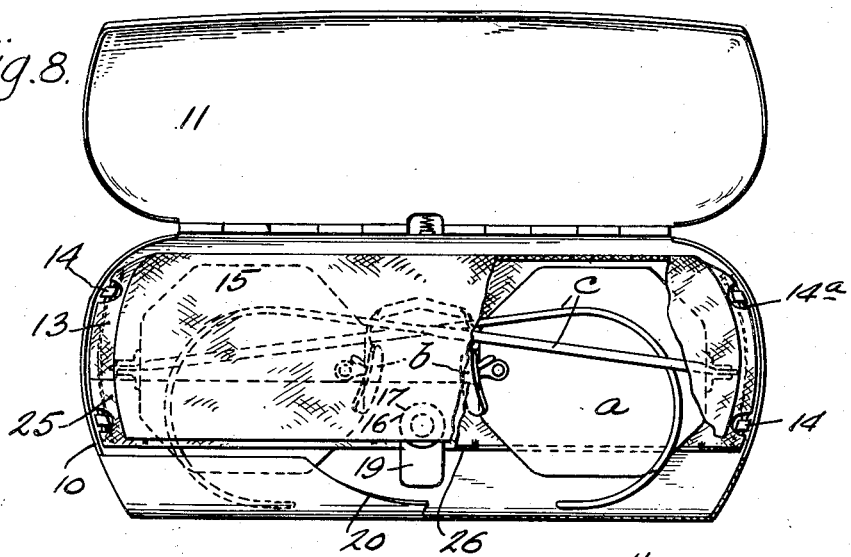
Fig. 8.
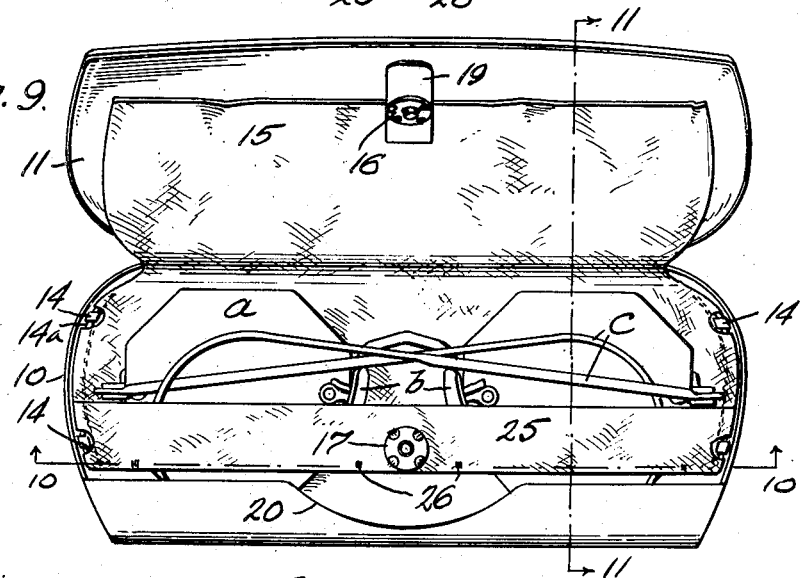
Fig. 9.
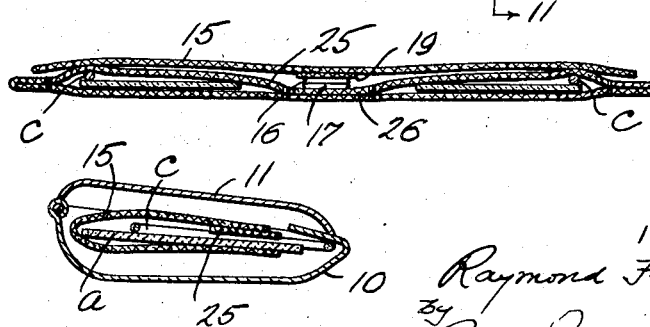
Fig. 10.
Fig. 11.
INVENTOR.
Raymond F. Schutz
By
Parker, Prochnow & Farmer.
ATTORNEYS.

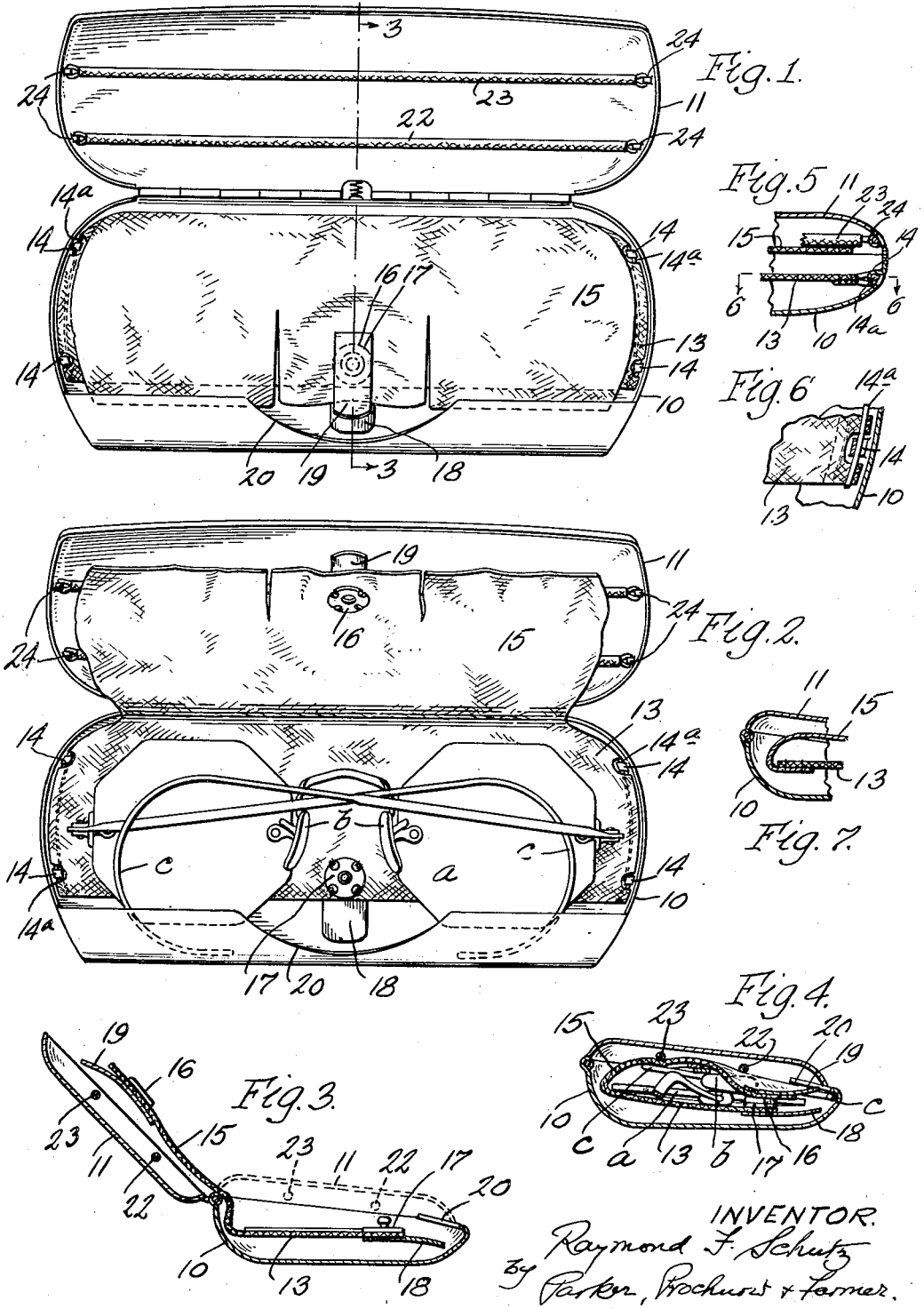

Patented Jan. 16, 1940

2,187,176

UNITED STATES PATENT OFFICE 2,187,176

SPECTACLE CASE

Raymond F. Schutz, Buffalo, N. Y.

Application June 27, 1938, Serial No. 215,986

11 Claims. (Cl. 206—6)

This invention relates to improvements in cases of the kind used for carrying and protecting eyeglasses and spectacles when not in use, and has for a primary object to provide such cases with improved means for effectually preventing injury to the eyeglasses or spectacles while in the cases.

In this specification, the term "spectacles" is employed to designate nose glasses and other eyeglasses of whatever type, except where the context makes it clear that only spectacles equipped with bows or sidepieces for retaining them in place on the wearer are intended.

While these pocket or portable cases, in which spectacles are commonly carried when not in use do protect the spectacles from damage or injury from many causes, it is well known that spectacles are frequently broken or damaged while in the cases because, due to careless handling, knocking or dropping of the cases, the spectacles are subjected to injurious jar or contact with the walls of the cases, which are usually made of metal or relatively rigid material. Attempts have been made heretofore to construct or equip the cases so as to prevent the spectacles from being damaged while therein, but these previous cases have not been entirely effectual, or have been objectionable for one or another reason.

Other objects of my invention are to provide a spectacles case which is furnished with novel means that will yieldingly support the spectacles in the case out of contact with the walls thereof and prevent either flatwise or edgewise injurious contact or impact of the spectacles with the walls or rigid parts of the case when the case is subjected to jar or shock; in which the spectacles are yieldingly or resiliently supported by flexible or elastic strips, bands or pieces that hold them away from the walls of the case and prevent sidewise or edgewise contact of the lenses with said walls; which provides an elastic or resilient holder in the case in which the spectacles can be readily placed and from which they can be readily removed; in which the spectacles are held in the case out of contact with the walls thereof by flexible webs or strips stretched across the case between the bottom and top thereof; in which the case is provided with a resilient or elastic pocket or holder in which the glasses are placed and releasably secured so as to be held therein against unintentional displacement and contact with the walls of the case; and to provide a spectacles case which has the other features of advantage and improvement hereinafter described and set forth in the claims.

The accompanying drawings illustrate slightly different embodiments of my invention. In said drawings:

Fig. 1 is a plan view of one embodiment showing the case open and the elastic holder for the spectacles closed.

Fig. 2 is a similar view thereof showing the elastic holder opened and exposing the spectacles.

Fig. 3 is a transverse section thereof on line 3—3, Fig. 1 without the spectacles.

Fig. 4 is a similar section, showing this case closed, with the spectacles therein.

Fig. 5 is a vertical section of one end of the case showing the attaching means for the elastic strips.

Fig. 6 is a section on line 6—6, Fig. 5.

Fig. 7 is a fragmentary, transverse section of the closed case showing a slight modification of the elastic holder.

Figs. 8 and 9 are views, similar respectively to Figs. 1 and 2, of another embodiment of the invention.

Fig. 10 is a longitudinal section of the elastic holder on line 10—10, Fig. 9.

Fig. 11 is a transverse section of the case, closed, on line 11—11, Fig. 9.

10 represents a spectacle case of known construction comprising a hollow body formed with front, rear and end walls, and a cover or lid 11 which is hinged to the rear wall of the body, and may be releasably held in closed position by the usual lid spring or other closing or securing means. Such cases are commonly made of sheet metal or other suitable, relatively rigid material, and may be covered exteriorly and lined interiorly with suitable materials (not shown) to give the cases an attractive, finished appearance.

A strip or web 13 of flexible material, which may be ordinary elastic webbing used in suspenders and other wearing apparel, extends across the cavity of the body of the case, for example, lengthwise thereof, with the ends of the strip attached to the ends of the case in any suitable manner to fasten the strip in place and hold it stretched or under tension so that between its ends the strip will be held spaced above and out of contact with the bottom wall of the case. For example, as shown, the ends of the elastic strip may be engaged over securing hooks 14 punched out from the end walls of the case, or the elastic strip may have hooks at its ends held in eyes on the ends of the case, or it may be secured at its ends by fastening means of any suitable type or form. The ends of the elastic strip shown are reinforced by slender wires or cords 14a engaging the hooks 14.

Preferably, this elastic strip or web is wide enough to extend from near the front wall to near the rear wall of the case, and when the spectacles *a* are placed in the case, the lenses thereof are adapted to lie on and be supported by the elastic strip, out of contact with the bottom of the case.

Extending from the rear edge of the elastic strip or web 13 is a flexible cover flap 15 which is adapted to be folded forwardly over the strip 13 so as to overlie the spectacles, so that the spectacles in the case will be confined between the strip 13 and the cover flap 15. This cover flap may be an integral part of the elastic strip or web, or it may be formed, as shown in Fig. 7, by a separate piece of chamois skin or other appropriate material stitched or otherwise attached to the rear edge of the strip 13.

The front middle portion of the cover flap being flexible, is adapted to be pressed in between the nosepieces *b* and adjacent edges of the spectacle lenses and there secured or held by suitable releasable fastening means, such for example, as an ordinary stud and socket snap fastener having complementary members 16 and 17 attached to the front portions of the flap 15 and elastic strip 13. Since spectacle nosepieces ordinarily are offset or project out from the plane of the lenses, the cover flap when fastened down between them, is drawn or stretched more or less over the nosepieces and thus acts to hold the spectacles securely against endwise movement in the case and prevent contact of the ends of the spectacles with the ends of the case. Furthermore, since the upper flap 15 is folded over the upper edges of the lenses, and the bows *c* of the spectacles, which are resilient, bear against the front wall of the case, the lenses are resiliently held in place edgewise and prevented from contact with the front or rear edges or walls of the case. Suitable finger tabs or tongues 18 and 19 are shown attached to and projecting forwardly from the front edges of the elastic strip 13 and cover flap 15, and the middle upper portion of the front wall of the case is cut away or recessed at 20 to facilitate the fastening and unfastening of the cover flap 15. As shown in Figs. 1 and 2, the cover flap 15 is slit at its front portion at opposite sides of its fastening device, and this slitting may be resorted to, if necessary, to prevent too great pressure on the spectacles when the cover flap is fastened down between the nosepieces.

The spectacles placed and secured as explained, between the web 13 and cover flap 15 are resiliently supported out of contact with the bottom wall of the case, and also, with the exception of the ends of the spring bows, out of contact with the front, rear and end walls of the case, so that the lenses or other parts of the spectacles which are liable to injury, are held from contact with or striking against these walls or other rigid parts of the case.

For resiliently holding the spectacles spaced from and preventing contact of the same with the closed lid or top wall of the case, in the construction shown in Figs. 1 to 7, narrow elastic strips or cords 22 and 23 are stretched lengthwise in the lid between the ends thereof to which the ends of the elastic strips or cords are attached. These elastic cords shown are of round or circular cross section and may be attached at their ends to the ends of the case by engagement with the hooks 24 punched out from the end walls of the case, or by attaching means of any other suitable character. Since the case lid is of more or less concavo-convex or hollow form, the elastic cords 22 and 23, which are stretched sufficiently to normally maintain them straight, are held spaced from or out of contact with the top wall or lid, and when the lid is closed, these elastic cords will bear down on the spectacles and resiliently hold them from contact with the case top. The elastic cords may be located and spaced apart so that when the lid is closed, they will engage the spectacles at the front and rear of the straight portions of the bows *c* and nosepieces, thus assisting in preventing forward and rearward movement of the spectacles in the case. The lid-closing spring or other means for holding the lid closed will maintain the necessary resilient pressure of the elastic cords 22, 23 against the spectacles to prevent the spectacles from contact with the lid.

As disclosed in Figs. 8 to 11, the construction is substantially as before described, except that instead of providing elastic bands or cords 22 and 23 in the lid, contact of the spectacles with the top of the case is prevented by an upper flexible band or strip 25 in the case body adapted to overlie the spectacles. As shown, this band is stretched lengthwise in the case above the front portion of the web 13, and the upper band 25, which is narrower than the underlying elastic strip, may be formed either by a folded-over front edge portion of the strip 13, or by a separate band of flexible material. The band 25 may be fastened at its ends so that it will be stretched or held under tension, either by securing its ends to the ends of the strip 13, or by fastening the ends of the band 25 in the ends of the case in any other suitable manner. Preferably, also the lower edge of the band 25 is attached at its middle portion, or between the spectacle lenses, to the front edge portion of the underlying elastic strip 13, as indicated at 26, while between their end and middle attached portions the front edges of the band 25 and strip 13 are left unattached, so that the lower edge portions of the lenses and the curved ends of the bows *c* can project out through the slits thus formed, as indicated in Figs. 9 and 11.

The band 25 being relatively narrow and located at the front portion of the case, enables the spectacles to be readily slipped forwardly into the pockets thus formed between the underlying and overlying strips or pieces 13 and 25. In this construction, as in the other, the spectacles are secured in place by fastening the cover flap 15 down between the lenses, and when the cover flap is thus secured, the lenses will be resiliently supported in the case, as before explained, so as to prevent contact of the lenses or other portion of the spectacles which are liable to injury, with any rigid walls or portions of the case. The described means of the forms shown will effectually prevent breaking or injury to the spectacles by the dropping, knocking or other rough handling of the case.

While the strips or pieces 13 and 25, or 13 and 22, 23 between which the spectacles or eyeglasses are suspended in the case, out of contact with or spaced from the case walls, have been described as elastic or as being made of elastic webbing, my invention is not limited to the use of such materials. Other suitable flexible materials, such for instance as chamois skin, thin leather, velvet or other fabrics adapted to be stretched taut across the case so as to yieldingly suspend the spectacles or eyeglasses away from the case walls, can be employed instead for these strips or pieces.

I claim as my invention:

1. A case for spectacles comprising a body and lid, upper and lower elastic strips stretched lengthwise in the case and secured at their end portions to hold the strips under tension and out of contact with the bottom and lid walls of the case, said elastic strips being arranged to bear resiliently against opposite sides of spectacles placed in the case between them and resiliently hold the spectacles from contact with the bottom and lid walls of the case, and a cover piece passing over the upper edges of the spectacles and secured to hold the same from contact with the rear wall of the case.

2. A case for spectacles comprising a body and lid, a web of flexible material stretched and held under tension in the case out of contact with the bottom thereof and on which the spectacles are adapted to lie, an upper piece of flexible material extending lengthwise in the case out of contact with the top wall of the case and arranged to bear resiliently on the spectacles, said web and upper piece resiliently holding the spectacles in the case from contact with the top and bottom walls of the case, and means for holding said spectacles between said flexible pieces against edgewise movement in the case.

3. A case for spectacles comprising a body and lid, a web of flexible material stretched and held under tension in the case out of contact with the bottom thereof and on which the spectacles are adapted to lie, an upper piece of flexible material extending lengthwise in the case out of contact with the top wall of the case and arranged to bear resiliently on the spectacles, said web and upper piece resiliently holding the spectacles from contact with the top and bottom walls of the case, a flexible flap extending from the rear portion of the case over the spectacles, and means for securing the front portion of said flap down at the front of the spectacles to resiliently resist forward, rearward and endwise movement of the spectacles.

4. A case for spectacles comprising a body and lid, a lower piece of flexible material stretched lengthwise in the case out of contact with the bottom thereof and on which the spectacles are adapted to lie, an upper piece of flexible material stretched lengthwise in the case out of contact with the top wall of the case and arranged to bear resiliently on the spectacles, said upper and lower strips resiliently holding the spectacles from contact with the top and bottom walls of the case, and a flexible flap extending from said lower flexible piece over the spectacles and releasably secured to said lower piece to secure the spectacles against edgewise movement on said flexible piece.

5. A case for spectacles comprising a body and lid, a piece of flexible material stretched across the body of the case and held taut out of contact with the bottom wall thereof and on which the spectacles are adapted to lie, a flexible flap extending from said flexible piece over the spectacles and having its free end releasably secured to the flexible piece to retain the spectacles against shifting thereon, and a flexible piece stretched across the case above the spectacles and out of contact with the top wall of the lid and resiliently holding the spectacles out of contact with said top wall.

6. A case for spectacles comprising a body and lid, a piece of elastic material stretched across the body of the case out of contact with the bottom wall thereof and on which the spectacles are adapted to lie, a cover flap extending from the rear portion of said elastic piece over the spectacles and secured to the front portion of said elastic piece, and an upper elastic piece stretched across the case over the spectacles and out of contact with the top wall of the lid and arranged to hold the spectacles out of contact with said top wall.

7. A case for spectacles comprising a body and lid, a strip of elastic material stretched lengthwise in the case and spaced away from the bottom wall thereof and on which the spectacles are adapted to lie, a cover flap extending from the rear edge of said elastic strip over the spectacles and releasably secured to the front portion of said elastic strip, and an upper elastic strip stretched lengthwise in the case over the spectacles and spaced away from the top wall of the lid and arranged to hold the spectacles from striking said top wall.

8. A case for spectacles comprising a body and lid, a web of flexible material stretched in the case and spaced away from the bottom wall thereof and on which the spectacles are adapted to lie, a narrow upper flexible strip extending lengthwise in the body of the case above said web and between which web and upper strip the spectacles are adapted to be inserted forwardly, and a movable holding member extending from the rear portion of the case over the spectacles and releasably fastened down at its front portion between the spectacle lenses.

9. A case for spectacles comprising a body and lid, a piece of elastic material stretched across the body of the case out of contact with the bottom wall thereof and on which the spectacles are adapted to lie, a flap extending from the rear edge of said elastic piece over the spectacles and releasably secured to the front portion of said elastic piece, and an elastic strip stretched lengthwise in the case lid out of contact with the top wall thereof and adapted to bear resiliently on the spectacles lying on said under elastic piece when said lid is closed.

10. A case for spectacles comprising a hollow body and a lid, a broad web of flexible sheet material stretched across the cavity of the case and held under tension above and spaced from the bottom wall thereof and forming a resilient diaphragm-like support on which the spectacles are adapted to lie and are yieldingly supported in the case between and spaced from the bottom and top walls of the case, and means for yieldingly holding the spectacles on said web out of contact with rigid parts of the case and resisting edgewise movement of the spectacles in the case.

11. A case for spectacles comprising a body and lid, a web of flexible sheet material secured at marginal edge portions thereof in the case at peripheral portions of the case and stretched across the case with the web held under tension spaced away from both the bottom and top walls of the case, said web forming a resilient diaphragm-like support on which the spectacles lie and are yieldingly supported, and means for confining the spectacles on said web with the lenses out of contact with the walls of the case.

RAYMOND F. SCHUTZ.